(12) United States Patent
Favre et al.

(10) Patent No.: US 12,348,080 B2
(45) Date of Patent: Jul. 1, 2025

(54) STATOR WITH CLOSED SLOTS WITH A FLUID INJECTION COOLING SYSTEM FOR AN ELECTRIC MACHINE AND ELECTRIC MACHINE COMPRISING SAID STATOR

(71) Applicant: Mavel EDT S.P.A., Pont Saint Martin (IT)

(72) Inventors: Luca Favre, Pont Saint Martin (IT); Davide Bettoni, Pont Saint Martin (IT)

(73) Assignee: MAVEL EDT S.P.A., Pont Saint Martin (IT)

( * ) Notice: Subject to any disclaimer, the term of this patent is extended or adjusted under 35 U.S.C. 154(b) by 257 days.

(21) Appl. No.: 18/270,143

(22) PCT Filed: Dec. 30, 2021

(86) PCT No.: PCT/IT2021/050438
§ 371 (c)(1),
(2) Date: Jun. 28, 2023

(87) PCT Pub. No.: WO2022/144945
PCT Pub. Date: Jul. 7, 2022

(65) Prior Publication Data
US 2024/0063667 A1  Feb. 22, 2024

(30) Foreign Application Priority Data

Dec. 31, 2020  (WO) ............... PCT/IT2020/000090

(51) Int. Cl.
*H02K 1/16* (2006.01)
*H02K 1/20* (2006.01)
(Continued)

(52) U.S. Cl.
CPC ............ *H02K 1/165* (2013.01); *H02K 1/20* (2013.01); *H02K 3/487* (2013.01); *H02K 15/026* (2013.01); *H02K 15/062* (2013.01)

(58) Field of Classification Search
CPC .......... H02K 1/165; H02K 1/20; H02K 3/487; H02K 15/026; H02K 15/062
(Continued)

(56) References Cited

U.S. PATENT DOCUMENTS

| 5,030,877 A | * | 7/1991 | Denk | ............ H02K 3/47 290/52 |
| 2002/0135245 A1 | * | 9/2002 | Derleth | ......... H02K 9/227 310/64 |

(Continued)

FOREIGN PATENT DOCUMENTS

| EP | 3007319 A1 | 4/2016 |
| WO | WO 1999/008364 A1 | 2/1999 |
| WO | WO 2020/174187 A1 | 9/2020 |

OTHER PUBLICATIONS

International Search Report and Written Opinion dated Apr. 21, 2022, for International Application No. PCT/IT2021/050438, 11 pages.

*Primary Examiner* — Rashad H Johnson
(74) *Attorney, Agent, or Firm* — Frost Brown Todd LLP; Alexander J. Johnson

(57) ABSTRACT

A stator with closed slots is described, comprising a first internal stator part and a second external stator part configured to form the closed slots. The stator further includes a winding comprising at least a conductor configured to be wound in the stator closed slots into which are inserted the conductors forming the winding. The winding is overlapped starting with a lower conductor in correspondence with a bottom wall of the slot and ending with an upper conductor in correspondence with an upper wall of the slot to form a lower channel between the lower conductor and the bottom wall of the slot and an upper channel formed between the
(Continued)

upper conductor and the upper wall of the slot. The lower and upper channels serving as the passage of a cooling fluid of the stator.

16 Claims, 9 Drawing Sheets

(51) Int. Cl.
*H02K 3/487* (2006.01)
*H02K 15/026* (2025.01)
*H02K 15/062* (2025.01)

(58) Field of Classification Search
USPC .................................................. 310/216.069
See application file for complete search history.

(56) References Cited

U.S. PATENT DOCUMENTS

| | | |
|---|---|---|
| 2011/0309780 A1 | 12/2011 | Bandaru et al. |
| 2016/0226327 A1* | 8/2016 | Rippel .................... H02K 9/197 |
| 2019/0115794 A1 | 4/2019 | Liang et al. |
| 2019/0207439 A1* | 7/2019 | Marino .................... H02K 1/20 |
| 2019/0222091 A1 | 7/2019 | Degner et al. |
| 2020/0161917 A1* | 5/2020 | E Silva .................... H02K 3/24 |
| 2022/0200382 A1* | 6/2022 | Liu ........................ H02K 3/487 |
| 2022/0393538 A1* | 12/2022 | Engelhardt .......... H02K 15/021 |
| 2024/0063667 A1* | 2/2024 | Favre .................... H02K 15/062 |
| 2024/0213839 A1* | 6/2024 | Vogt ........................ H02K 1/165 |
| 2024/0258858 A1* | 8/2024 | Kuehbacher ............. H02K 9/19 |
| 2024/0313591 A1* | 9/2024 | Bradfield ................ H02K 1/20 |
| 2024/0413679 A1* | 12/2024 | Silva ........................ H02K 3/24 |

\* cited by examiner

STATOR WITH CLOSED SLOTS WITH A FLUID INJECTION COOLING SYSTEM FOR AN ELECTRIC MACHINE AND ELECTRIC MACHINE COMPRISING SAID STATOR

BACKGROUND OF THE INVENTION

The present invention relates to a stator for an electric machine with a fluid injection cooling system and to an electric machine comprising the stator.

In particular, the invention refers to a stator for a closed-slot rotating electric machine, preferably with a continuous winding made using a metal blade, comprising a cooling system with oil injection directly into the closed slots, in particular into channels obtained close to the slots.

Known electric machines include a fixed part, the stator, and a moving part, the rotor, coaxially arranged one inside the other. Typically, the rotor comprises a pack of laminations fixed on a rotation shaft, and is inserted inside the stator which includes an electric winding capable of generating a magnetic field that causes the rotor to rotate.

The stator is generally annular in shape and includes a plurality of radial slots, inside which the electric winding is obtained.

From International Patent Application WO2016188764, an electric machine with a stator with closed slots is known, for example a synchronous electric motor with reluctance assisted by permanent magnets, which provides a wall for closing the stator slots in correspondence with the rotor, to make closed slots that reduce the problems caused by torque ripple, with associated vibrations and noise.

For the realization of the electric windings of closed-slot stators, it is known to use electric conductors made using strips or continuous wires, or copper strips that are bent in the central part to form hairpin-shaped strips, to be inserted in the stator slots.

The shape and bending angles of the strips vary with the variation of the geometry of the stator and the slots, and with the variation of the winding scheme.

These strips are inserted into the stator slots according to a certain pattern, to obtain the exact number of turns necessary to compose the stator winding.

A problem of known stators is caused by the thermal flux generated by the Joule effect when the winding is crossed by electric current: this heat flux must be evacuated to improve efficiency and prevent damage to the electric machine.

It is known to use cooling systems for electric motors' stators, with oil that circulates in channels obtained in the external part of the stator.

These known cooling systems have the problem that oil circulates in the external part of the stator, distanced from the windings that represent the main heat source of the machine, reducing the efficiency of the heat exchange. Another problem of known stator cooling systems is requiring to modify the stator in order to obtain the oil circulation channels close to the slots, increasing the design and production complexity.

SUMMARY OF THE INVENTION

Object of the present invention is solving these problems by means of a stator with closed slots for an electric machine and an electric machine comprising the stator which allow to obtain a better efficiency of the electric machine by realizing windings with greater active length, lower costs, better filling of the slots by the winding, also simplifying the production process.

Other objects of the present invention are the following: providing a high heat exchange between the cooling fluid and the motor windings; improving the performance of an electric machine during continuous operations, increasing the performances duration before derating; improving the performance of the electric machine during peak operations, allowing to reach higher values of peak currents; improving globally the electric machine efficiency; possibility of obtaining more powerful motors, with equal dimensions, compared to equivalent versions without the cooling system of the invention; obtaining a cooling system which allows for less assembly and production complexity.

The aforementioned and other objects and advantages of the invention, which will appear from the following description, are achieved with a closed-slot stator for an electric machine and an electric machine comprising such a stator, as those described in the independent claims.

Preferred embodiments and non-trivial variants of the present invention are the subject matter of the dependent claims.

It is understood that all attached claims form an integral part of the present description.

It will be immediately obvious that innumerable variations and modifications (for example relating to shape, dimensions, arrangements and parts with equivalent functionality) can be made to what is described, without departing from the scope of the invention as appears from the attached claims.

BRIEF DESCRIPTION OF THE DRAWINGS

The present invention will be better described by some preferred embodiments thereof, provided as a non-limiting example, with reference to the attached drawings, in which.

DETAILED DESCRIPTION OF PREFERRED EMBODIMENTS

Figure 1:
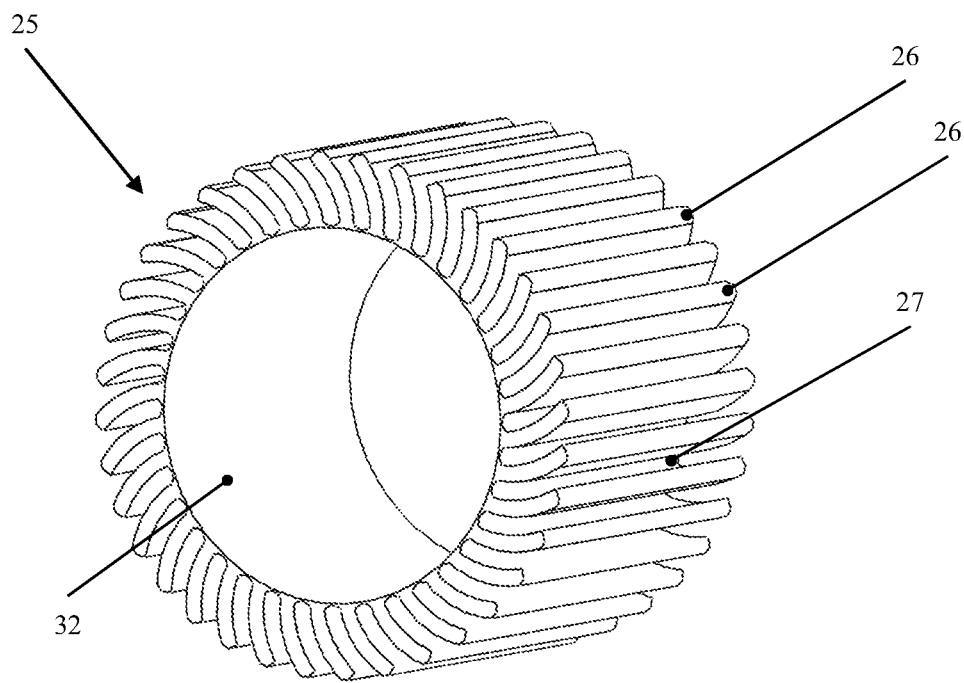
FIG. 1 shows a perspective view of an internal part of a stator of an electric machine according to the invention.
Figure 2:
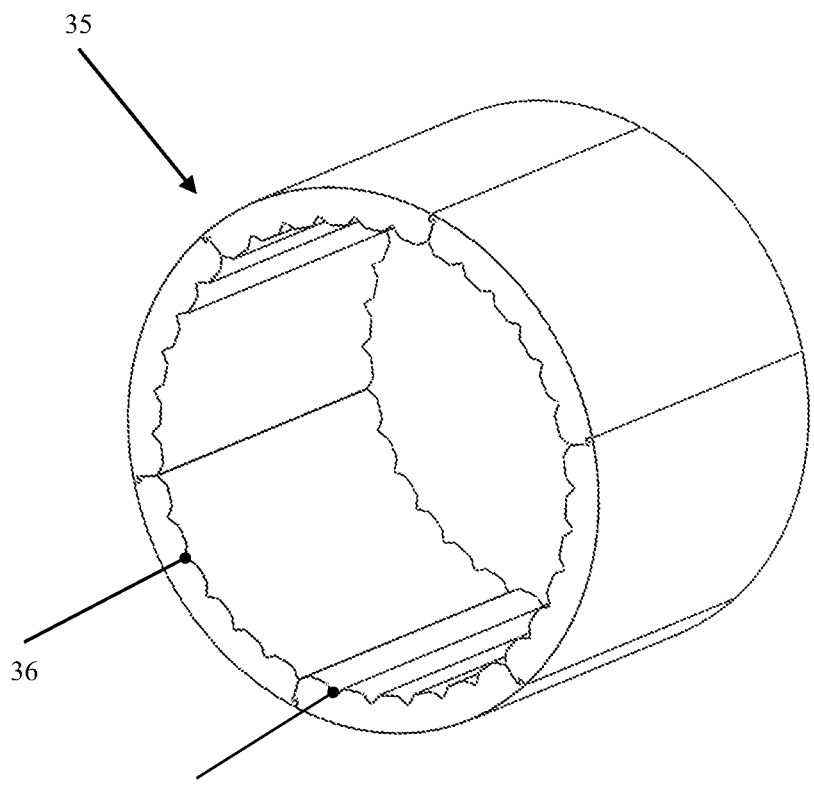
FIG. 2 shows a perspective view of an external part of a stator of an electric machine according to the invention.
Figure 3:
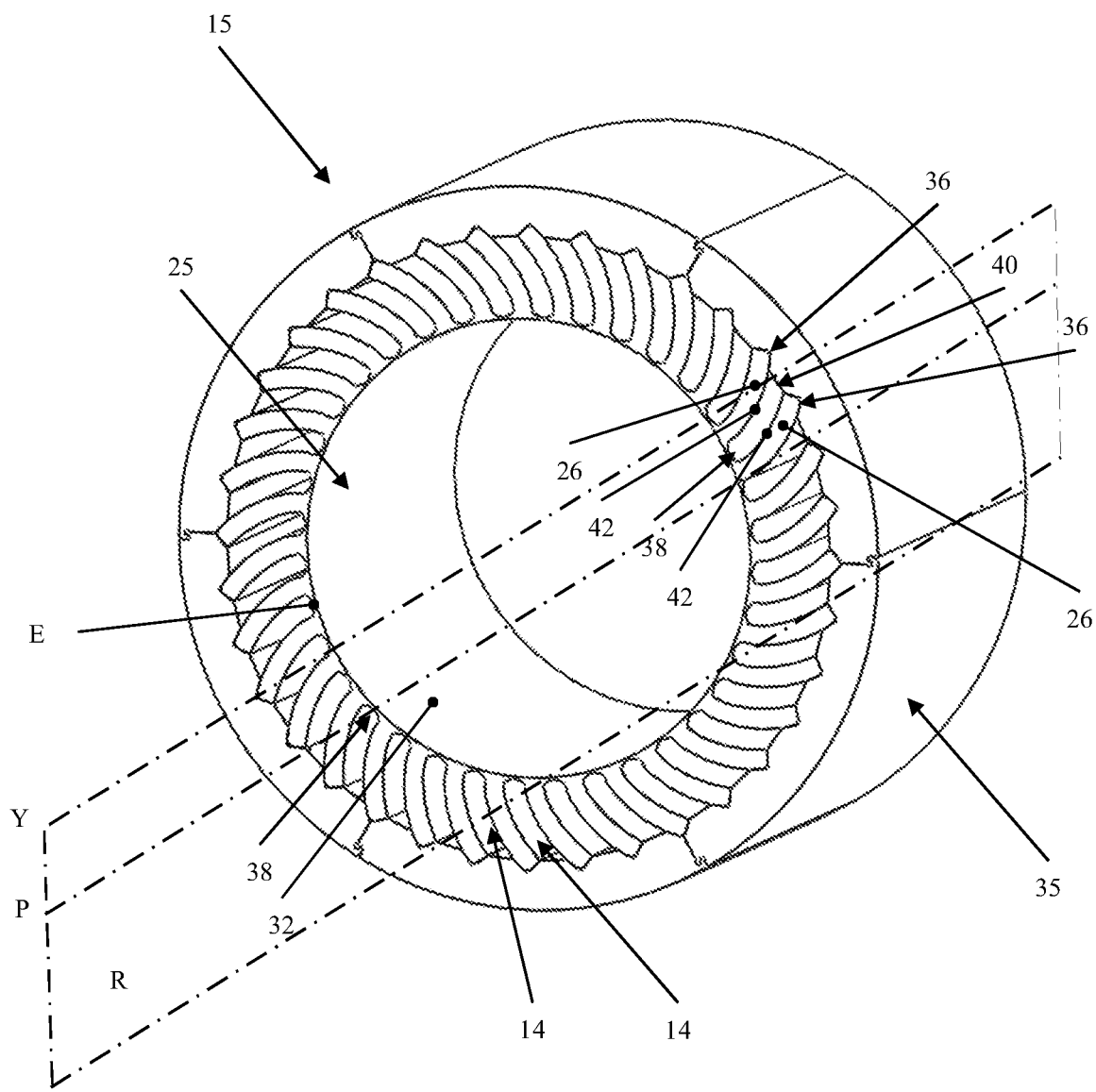
FIG. 3 shows a perspective view of a stator of an electric machine according to the invention.
Figure 4:
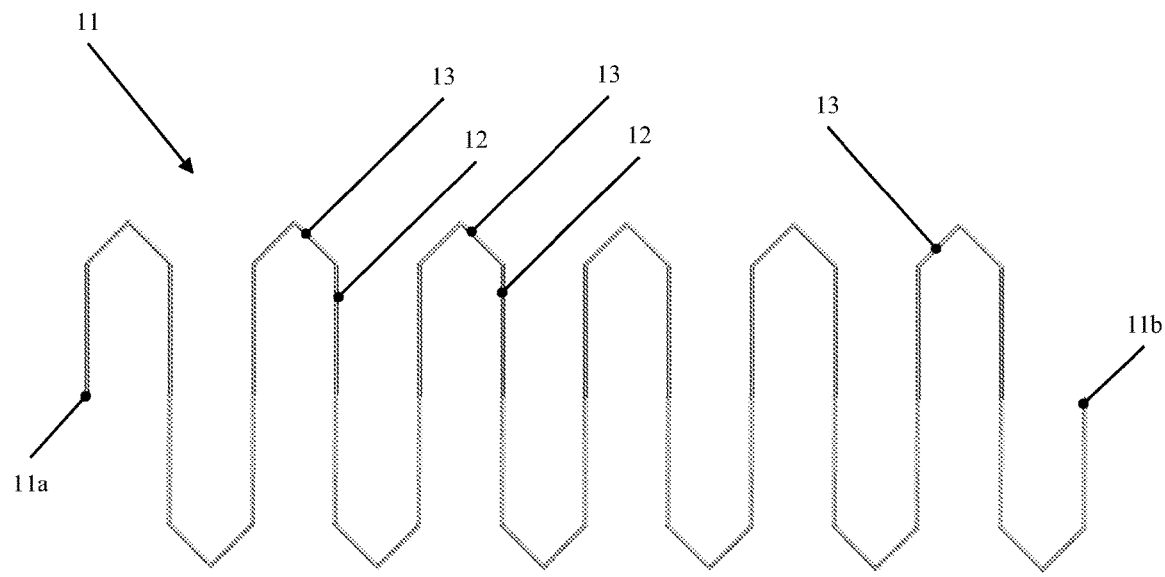
FIG. 4 shows a view of a continuous winding for a stator of an electric machine according to the invention.
Figure 5:
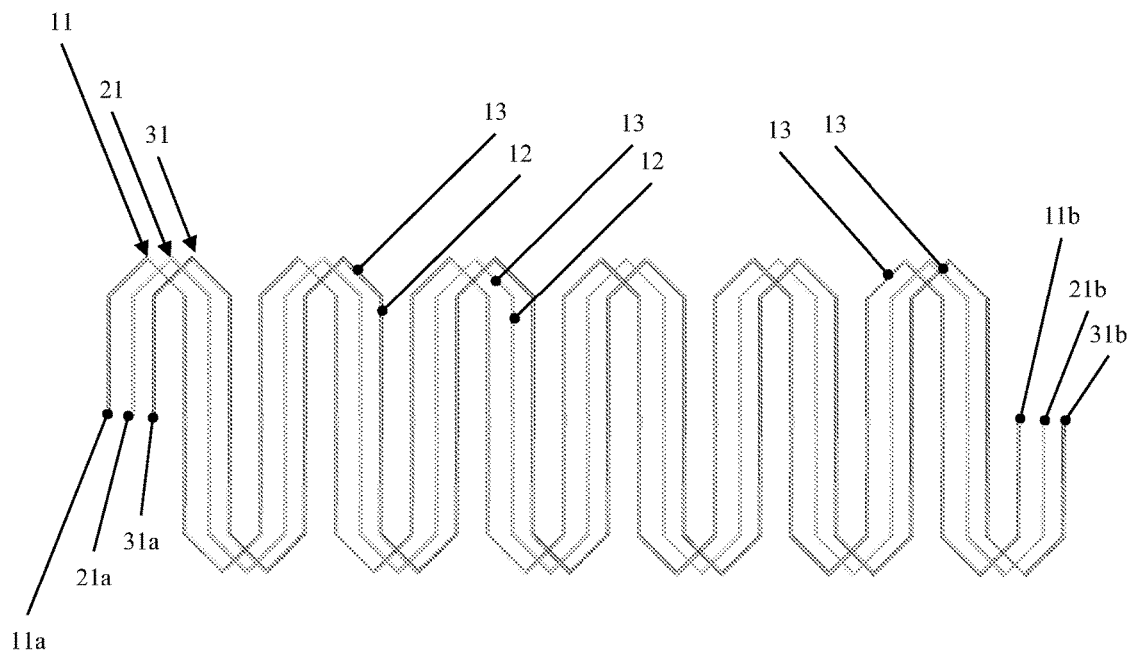
FIG. 5 shows a view of a plurality of continuous windings for a stator of an electric machine according to the invention.
Figure 6:
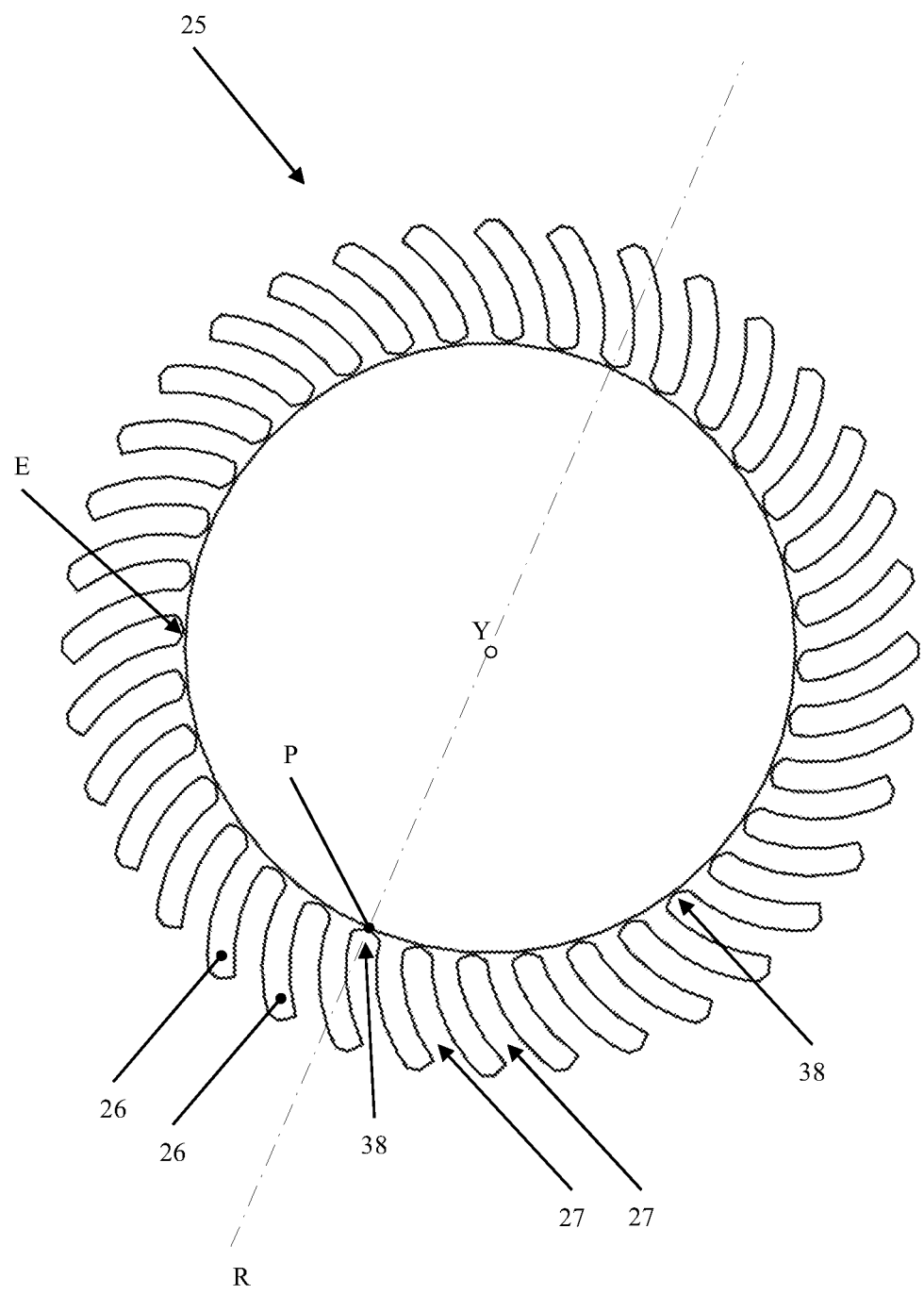
FIG. 6 shows a schematic front view of an internal part of a stator according to the invention.
Figure 7:
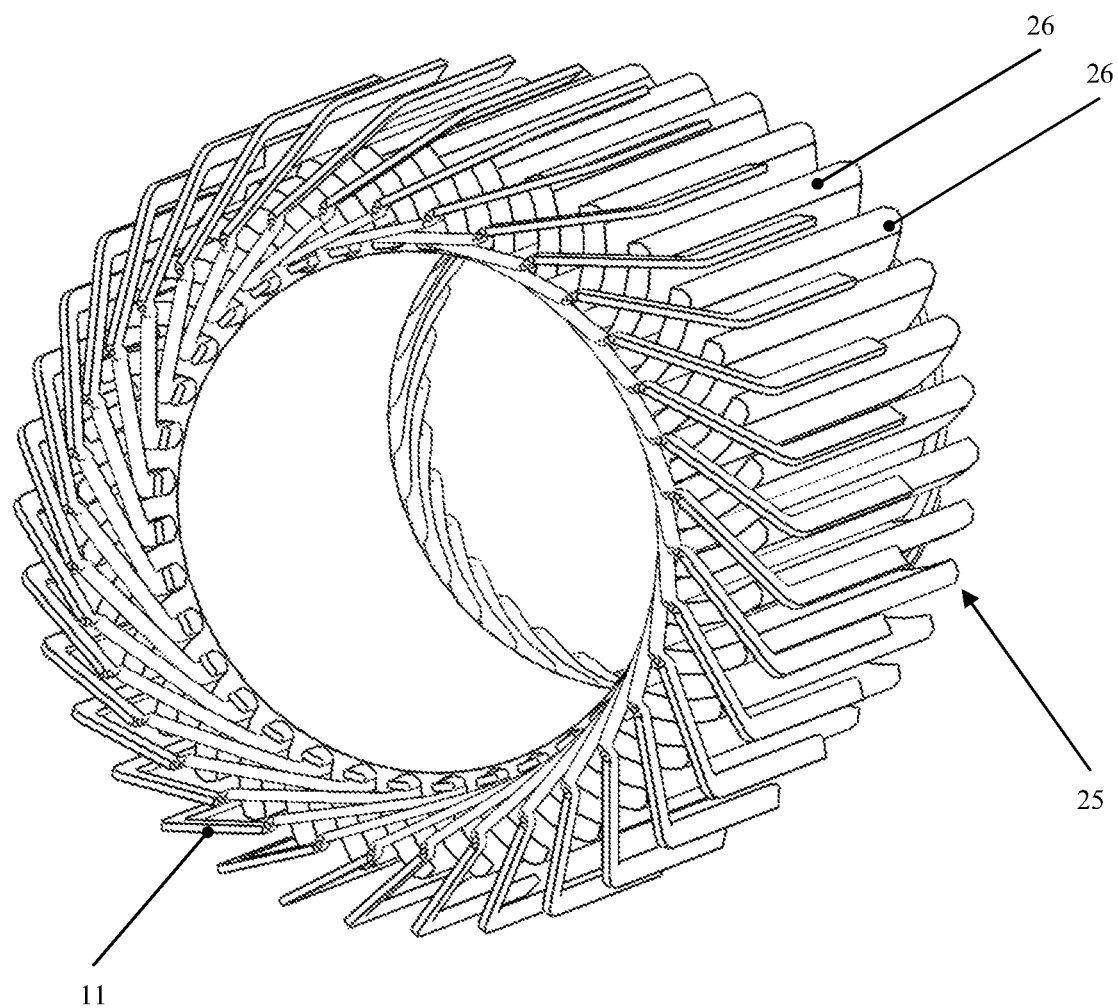
FIG. 7 shows a perspective view of an internal part of a stator with a continuous winding according to the invention.
Figure 8:
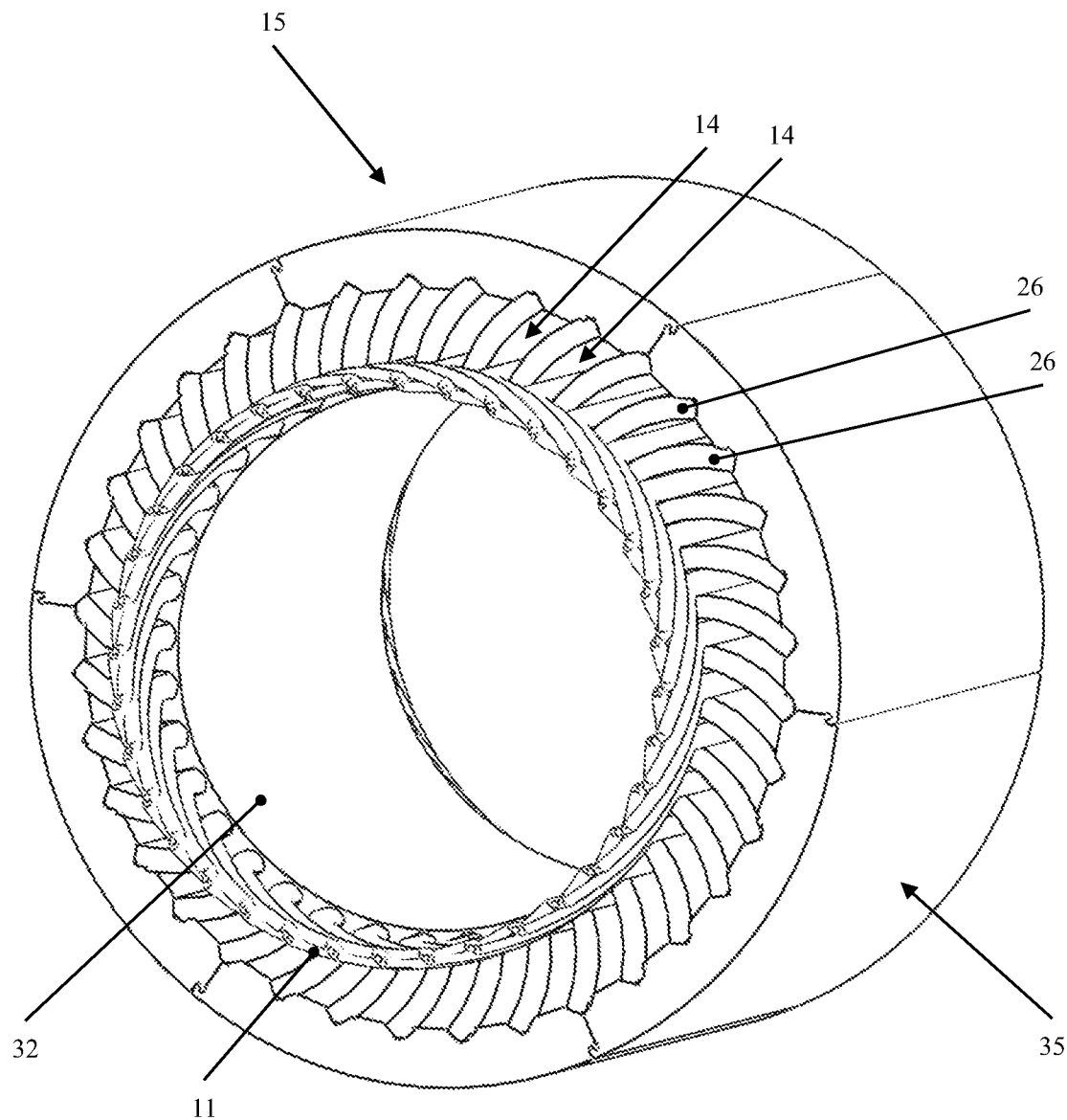
FIG. 8 shows a perspective view of a stator of an electric machine with a continuous winding according to the invention.
Figure 9:
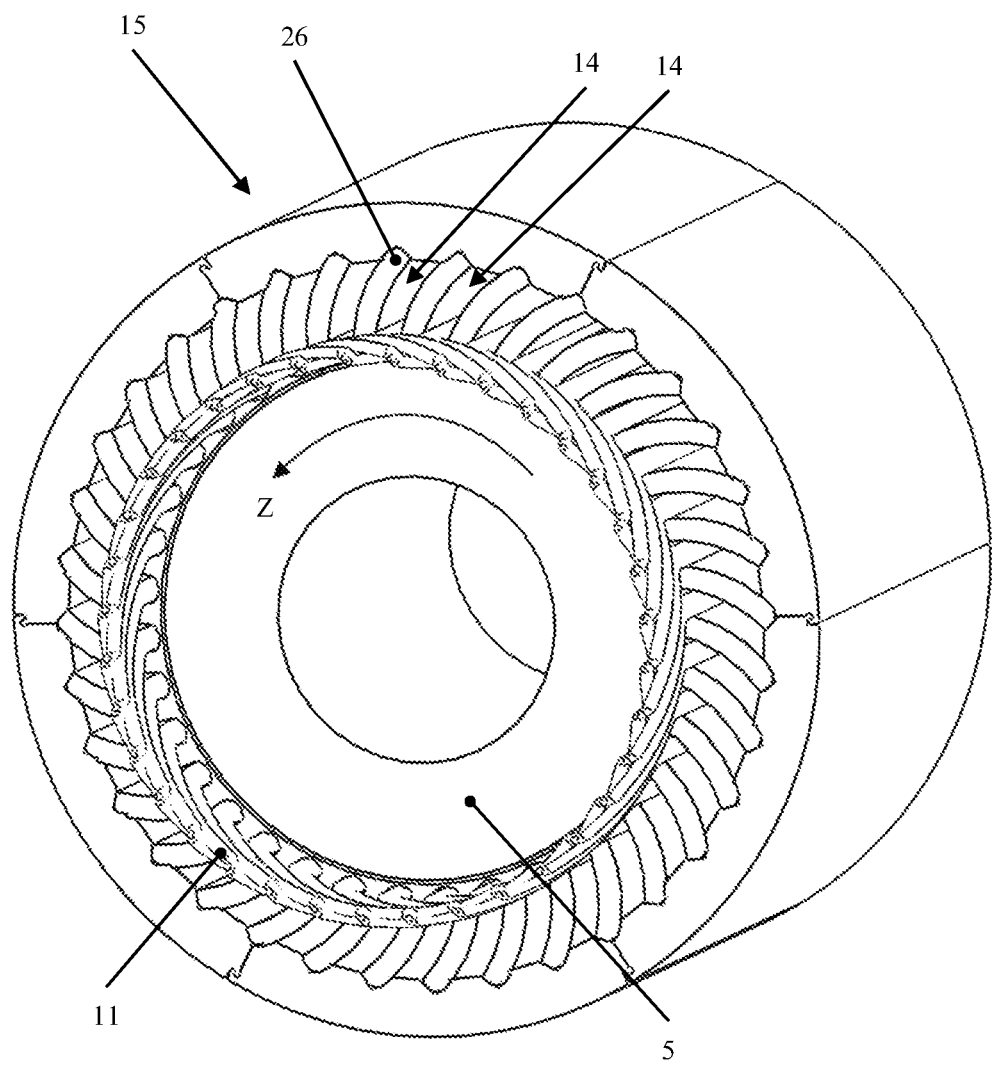
FIG. 9 shows a perspective view of a rotor and a stator of an electric machine with a continuous winding according to the invention.

With reference to the figures, the stator with closed slots, preferably with continuous winding, will be described below for an electric machine according to the invention, which comprises a first internal stator part 25 comprising a plurality of longitudinal teeth 26, spaced apart by a configured space 27 to make the lower part of the closed slots 14 of the stator, and a second external annular stator part 35, preferably comprising a plurality of seats 36 complementary to the teeth 26 of the first stator part 25 and configured to associate with the first stator part 25, in order to form the closed slots 14 and the stator 15. Preferably, the seats 36 obtained in the second stator part 35 are configured to fit together with the teeth 26 of the first stator part 25, in order to form a plurality of closed slots 14 of the stator, by means of a reciprocal sliding movement of the first internal stator part 25 and of the second external part 35, for example along the direction of the longitudinal Y axis of the stator 15, realizing a coupling, for example dovetail-type or other known type of coupling.

The closed slots 14 are arranged, preferably equidistant from each other, along a cylindrical internal wall 32 of the stator 15 configured to house a rotor 5, and each slot 14 comprises a bottom wall 38 arranged in the direction of the longitudinal Y axis of the stator 15, in proximity of the inner wall 32 at a distance E from the inner wall 32 and an upper wall 40.

The slots 14 are arranged along the direction of the longitudinal Y axis of the stator 15 and have an asymmetrical conformation with respect to a plane R passing through the longitudinal Y axis of the stator 15 and for a centreline P of the slot 14 in correspondence with the internal wall 32; preferably, the slots 14 have an asymmetrical conformation with respect to a plane R passing through the longitudinal Y axis of the stator 15 and through a centreline P of the bottom wall 38.

Each closed slot 14 of the stator 15 is formed by two side walls 42 of two adjacent teeth 26 made in the first internal stator part 25, by the bottom wall 38 connecting the two adjacent teeth 26 and by the upper wall 40, preferably formed by a wall for connecting two adjacent seats 36 made in the second external stator part 35; for example, the bottom wall 38 has a semi-circular or arched shape.

In a preferred embodiment of the invention, the side walls 42 of a slot 14 are asymmetrical, in particular with respect to the plane R; preferably, the side walls 42 of the groove are curved or concave, and more preferably have the concavity made in such a way as to optimize the efficiency or operation of the electric machine in a desired operating direction; for example, the concavity faces in a specific direction with respect to a preferred rotation direction Z of the rotor 5.

Figure 10:
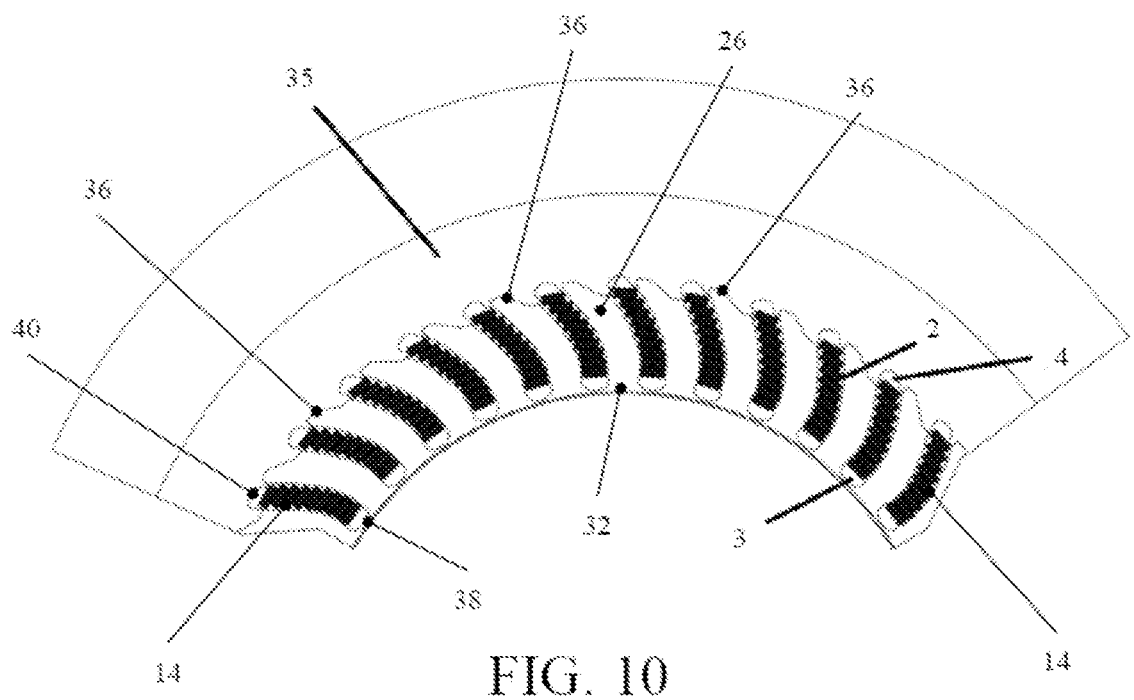
FIG. 10 shows a partial schematic front view of a stator according to the invention.
Figure 11:
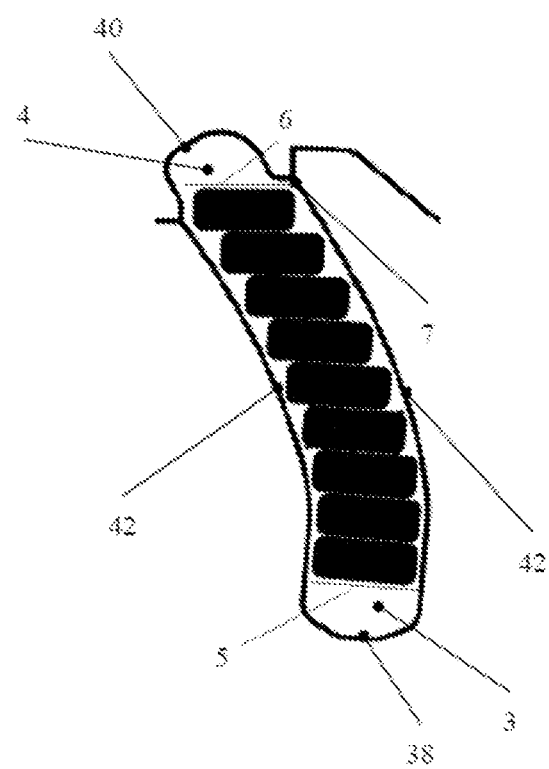
FIG. 11 shows a schematic front view of a closed slot of a stator according to the invention.
Figure 12:
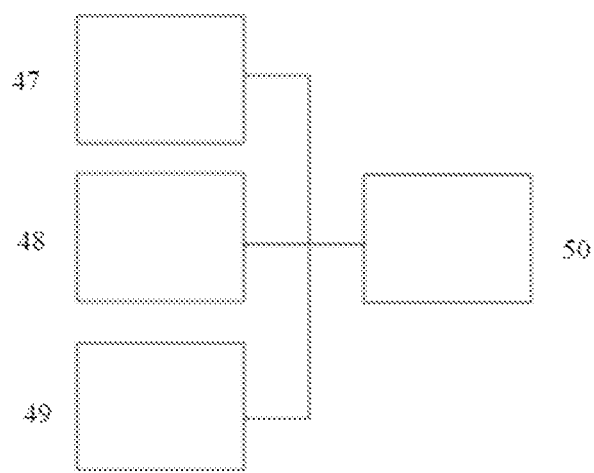
FIG. 12 shows a block diagram of a closed-slots stator cooling system according to the invention.

As shown in FIGS. 10 and 11, the closed-slots stator 15 for an electric machine according to the invention comprises: the closed slots 14 into which are inserted the conductors, preferably the straps 2, forming the winding, overlapped starting with a lower conductor (strap) 5 in correspondence with the bottom wall 38 of the slot 14 and ending with an upper conductor (strap) 6 in correspondence with the upper wall 40 of the slot 14, a lower channel 3 formed between the lower conductor (strap) 5 and the bottom wall 38 of the slot 14, an upper channel 4 formed between the upper conductor (strap) 6 and the upper wall 40 of the slot 14, the lower 3 and upper 4 channels serving the passage of a cooling fluid, preferably oil, of the stator 15.

Preferably, the slot 14 comprises a shrinkage and/or a support teeth 7 in correspondence with the bottom wall 38 and/or in correspondence with the upper wall 40 of the slot 14, to prevent inserting the strap 2 in contact with the bottom wall 38 and/or the upper wall 40 and to leave a free space to form the lower 3 and upper 4 channels; preferably the bottom wall 38 and the upper wall 40 of the slot 14 have a semi-circular or arched shape.

In the embodiment of the closed-slots stator 15 of the invention, which comprises the side walls 42 of the slot 14 curved or concave, the slot 14 also comprises micro-channels formed in the space between the conductor 2 and the side walls 42; the additional fluid (oil) passage increases the heat exchange between the cooling fluid and the conductor 2.

The cooling system with fluid injection of the stator 15 with closed slots 14 of the invention comprises a pump 48, a thermostat 47 and known suitable temperature and flow sensors 49 positioned downline of the electric machine 50 in order to make the cooling fluid flow inside the channels 3, 4 at a constant temperature and flow.

Thanks to that, the evacuation of the heat in the stator 15 is very efficient, since it happens directly in contact with the winding conductors that are the main source of heat dissipation of the electric machine.

The cooling system allows to limit the rise of the temperature of the winding during the functioning of the electric machine, limiting the increase in resistivity of the conductor with temperature, reducing the conduction and proximity losses with equal current, compared to equivalent versions without cooling channels.

Advantageously, the efficiency of the electric machine increases considerably and, in the face of lower losses, it is possible to improve performance during continuous operations of the electric motor and to reach higher currents during peak operations. Average power increases, as well as mass power, allowing to obtain lighter machines with equal power compared to equivalent machines without the cooling directed on the windings.

In a preferred embodiment of the invention, the closed-slots stator 15 of the invention comprises a continuous winding comprising at least one strip 11, 21, 31, which in turn comprises a plurality of first sectors 12 connected to each other by a plurality of second sectors 13 alternating with them, the at least one strip 11, 21, 31 being configured to be wound on the first internal stator part 25, positioning the first sectors 12 of the strip 11, 21, 31 in the spaces 27 between the teeth 26. Preferably the first sectors 12 are parallel, each first sector 12 being connected with at least one end thereof to a second sector 13, and the winding comprises three strips 11, 21, 31 alternating with each other.

In a preferred embodiment of the stator 15 with closed slots according to the invention, the second external annular stator part 35 is composed of sectors 45 associated with each other.

Advantageously, the stator 15 with closed slots with cooling system with injection of fluid of the invention allows making windings with lower costs, better filling of the slots by the winding, also simplifying the production process.

In addition, the closed-slot stator with cooling system with fluid injection of the invention allows optimizing the efficiency or operation of an electric machine in a desired operating direction.

We claim:
1. A stator with closed slots comprising:
    a first internal stator part which comprises a plurality of longitudinal teeth, spaced by a space configured to form a lower part of the closed slots of the stator;
    a second external stator part, configured to form together with the teeth the closed slots and the stator;
    a winding comprising at least a conductor configured to be wound in the stator closed slots;

the closed slots into which are inserted the conductors forming the winding, overlapped starting with a lower conductor in correspondence with a bottom wall of the slot and ending with an upper conductor in correspondence with an upper wall of the slot;

a lower channel formed between the lower conductor and the bottom wall of the slot;

an upper channel formed between the upper conductor and the upper wall of the slot, the lower channel and the upper channel serving for the passage of a cooling fluid of the stator.

2. The stator of claim 1, wherein the closed slot comprises a shrinkage and/or a support teeth in correspondence with the bottom wall and/or in correspondence with the upper wall of the slot, to prevent inserting the conductor in contact with the bottom wall and/or the upper wall and to leave a free space to form the lower channel and the upper channel.

3. The stator of claim 1, wherein the bottom wall and the upper wall of the slot are curved or concave.

4. The stator of claim 1, wherein at least one slot is asymmetrical.

5. The stator of claim 4, wherein the at least one slot has an asymmetrical conformation with respect to a plane passing through a longitudinal axis of the stator and for a centreline of the slot in correspondence with the internal wall.

6. The stator of claim 4, wherein the at least one slot comprises asymmetrical side walls.

7. The stator of claim 6, wherein the side walls are curved or concave.

8. The stator of claim 7, wherein the side walls have the concavity facing along a specific direction with respect to a preferred direction of rotation of the rotor.

9. The stator of claim 7, wherein the closed slot also comprises micro-channels formed in the space between the conductor and the side walls to increase the heat exchange between the cooling fluid and the conductor.

10. The stator of claim 1, comprising a plurality of closed slots arranged along an internal wall of the stator configured to house a rotor, each slot comprising a bottom wall arranged in the direction of the longitudinal axis of the stator, in proximity to the inner wall.

11. The stator of claim 10, wherein the slots and/or the side walls have an asymmetrical conformation with respect to a plane passing through the longitudinal axis of the stator and through a centreline of the bottom wall.

12. The stator of claim 1, comprising:

a second external annular stator part comprising a plurality of seats complementary to the teeth of the first stator part and configured to associate with the teeth in order to form the closed slots and the stator;

a continuous winding comprising at least one strap configured to be wound on the first internal stator part in the spaces between the teeth.

13. The stator of claim 12, wherein the second external stator part is composed of sectors associated with each other.

14. The stator of claim 1, comprising at least one strip comprising a plurality of first sectors connected together by a plurality of second sectors alternating with them, the at least one strap being configured to be wound on the first internal stator part by positioning the first sectors in the spaces between the teeth.

15. An electric machine comprising the stator of claim 1.

16. A cooling system of the stator of claim 1, comprising a pump, a thermostat and temperature and flow sensors positioned downline of the electric machine of claim 15 in order to make the cooling fluid flow inside the channels at a constant temperature and flow.

* * * * *